United States Patent [19]

Trube et al.

[11] Patent Number: 4,886,311

[45] Date of Patent: Dec. 12, 1989

[54] GLOVE BOX, PARTICULARLY FOR MOTOR VEHICLES

[75] Inventors: Hans Trube, Herrenberg; Jürgen Körber, Sindelfingen; Santiago Duenas, Rottwell, both of Fed. Rep. of Germany

[73] Assignee: Daimler-Benz Aktiengesellschaft, Fed. Rep. of Germany

[21] Appl. No.: 274,780

[22] Filed: Nov. 23, 1988

[30] Foreign Application Priority Data

Nov. 25, 1987 [DE] Fed. Rep. of Germany ....... 3739921

[51] Int. Cl.[4] ................................................ B60R 7/04

[52] U.S. Cl. ................................................ 296/37.12

[58] Field of Search ....................... 296/37.12; 224/282

[56] References Cited

U.S. PATENT DOCUMENTS 3,503,648 3/1970 James .............................. 296/37.12

4,630,857 12/1986 Zweiniger et al. .............. 296/37.12

4,786,098 11/1988 Jobmann et al. ................. 296/37.12

FOREIGN PATENT DOCUMENTS 2727394 12/1978 Fed. Rep. of Germany .

2919079 11/1979 Fed. Rep. of Germany .

3427296 9/1985 Fed. Rep. of Germany ... 296/37.12

*Primary Examiner*—Robert R. Song

[57] ABSTRACT

A glove box, for motor vehicles is arranged beneath the instrument panel, and is provided with a lid pivotably mounted on it about a horizontal axis. A closing device secures the lid to the glove box. To reduce the risk of injury to vehicle occupants which results from the closing device, a lock part of the closing device is arranged on the underside of the instrument panel with a latchbolt fastened inside a cavity on the inside of the lid and a latch which can be activated through a traction cable from a remote location is provided.

6 Claims, 2 Drawing Sheets

GLOVE BOX, PARTICULARLY FOR MOTOR VEHICLES

BACKGROUND AND SUMMARY OF THE INVENTION

The invention relates to a glove box for motor vehicles, comprising a container and a lid which is mounted pivotably about an axis on the container between an open and closed position and has an inner part with a cavity constructed to house parts of a closing device for the lid.

The glove box in DE-OS No. 2,727,394 has a lid arranged with pivotal mobility. The lid has two lid halves constructed as injection molded plastic components, which define a cavity to receive parts of a closing device. As is clear from FIG. 6 and Page 9, paragraph 3 therein, the locking device is arranged on the lid and consists substantially of a push-button and a catch to be activated by the latter. According to FIGS. 5 and 6 and to Page 10, paragraph 2, the catch is passed through a passage aperture on the lid inner part in the region of the bearing housing. It is therefore arranged substantially outside the cavity formed by the lid and the lid inner part. In the closed position the catch cooperates with a retaining part, which may be fastened to the instrument panel, for example.

In other known glove boxes, parts of the securing device, namely the catch and the push-button, protrude out of the surface contour of the lid, so that a danger of injury exists particularly when the lid is open, because these parts are located in the collision zone of the passengers. In the case of a push-button which is constructed with a locked cylinder actuable by a key, the closing device, which is easily accessible, can easily be forced open.

The underlying object of the invention is to construct a glove box of the type initially mentioned so that the danger of injury and of forcing is reduced.

This object is achieved in a generic glove box which is constructed to have the closing device comprise a lock part fastened to the instrument panel of the vehicle and within which a latch is arranged. A latch bar, cooperating with the latch to secure the lid is arranged within a recesses in the lid which permits the introduction of the lock part and latch (in the closed position of the lid) into the recess of the lid inner part. By this means, the parts of the closing device which are provided on the lid of the glove box, do not stand out from the surface contour of the lid and therefore do not constitute a danger of injury when the lid is open. The sharp-edged latch is also arranged protected within the lock part. When the lid is closed n parts of the closing device are located in the region of the collision zone of the vehicle occupants. Because the closing device is neither visible nor accessible from outside when the lid is closed, the danger of the glove box being forced open is reduced.

Further features and advantages of the invention are obtained when the lock part is introduced into a recess of the lid inner part which is masked by pivotable flap when the lid is open. The parts of the closing device are therefore masked even when the lid is open.

Another feature has the latch and a bolt mounted pivotably in the lock part and each connected to a return spring. When the lid is open, the bolt presses the latch from an aperture in the lock part, so that latch bar can be introduced into the lock part when the lid is closed.

Another safety feature is obtained by having the latch connected to a traction cable fastened eccentrically and pivotably. The traction cable may be connected to a lock which is arranged in a safe region for the vehicle occupants, or to an automatic closing device This reduces the danger of injury to the vehicle passengers. Forcing open the glove box according to the invention is also rendered more difficult.

Other objects, advantages and novel features of the present invention will become apparent from the following detailed description of the invention when considered in conjunction with the accompanying drawings.

DETAILED DESCRIPTION OF THE DRAWINGS

Figure 1:
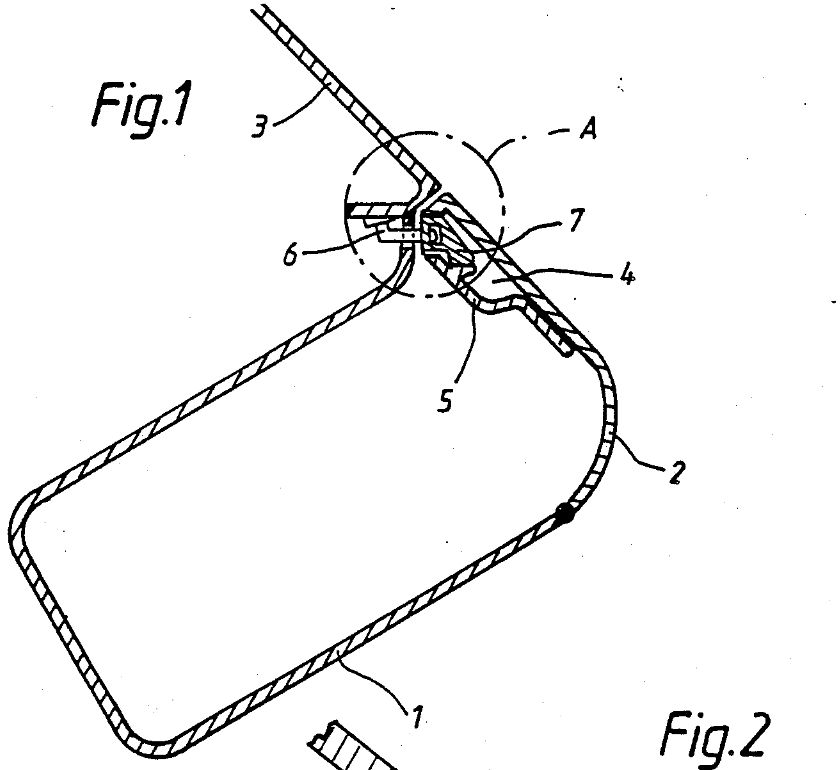
FIG. 1 shows a diagrammatic cross-section of the embodiment of the invention.

FIG. 1 shows a glove box, the compartment 1 of which is arranged beneath the instrument panel 3 of the vehicle. The compartment 1 is fastened in the front region of the passenger compartment of the vehicle in a known manner. In order to open and close the opening to the compartment 1, a lid 2 is pivotably mounted on a horizontal axis on the underside of the compartment 1. The surface contours of both the instrument panel 3 and the lid 2 merge flush with each other to avoid any outward protrusions into the passenger compartment.

Figure 2:
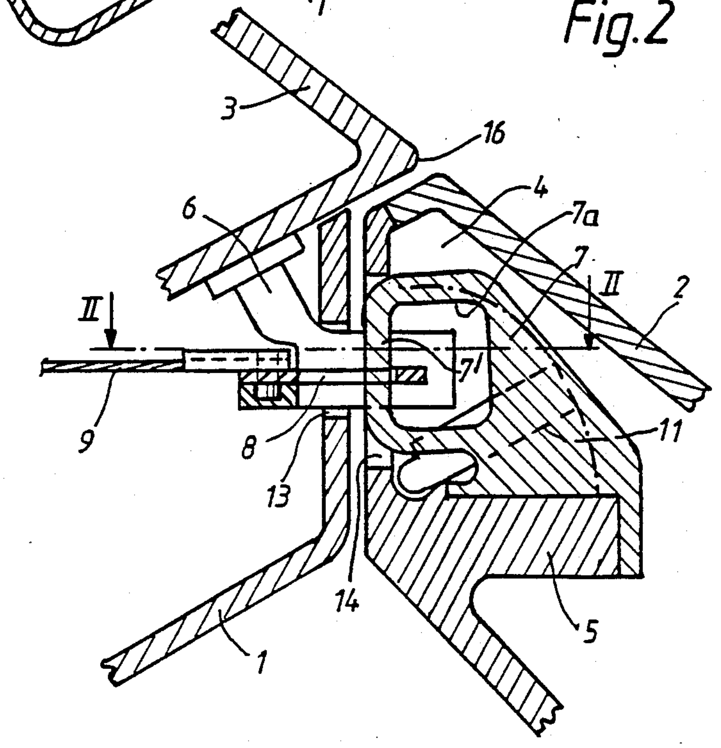
FIG. 2 shows a larger scale of the detail A from FIG. 1.

A closing device, which is shown in detail in FIG. 2, is provided to secure the lid 2 on the compartment 1. The closing device is arranged in the region beneath the instrument panel 3. In the closed position, a lid inner part 5 has an upper portion located parallel and opposite to an upper vertical flange part of the compartment 1 which is oriented approximately vertically to the vehicle floor. A lock part 6 is fastened to the underside of the instrument panel 3 and projects through an aperture 13 in the upper vertical flange part of the compartment 1.

In the closed position shown in FIG. 2, the lock part 6 extends through a recess 14 opening in the upper portion of the lid inner part 5 and into a cavity 4 which is formed by the lid 2 and the lid inner part 5. A latch bar 7 is fastened to the lid inner part 5 in the cavity 4. The latch bar 7 is in the shape of a strap with an internal aperture 7*a*. At the height of the recess 14 in the lid inner part 5, this aperture 7*a* is delimited by a bar portion 7′ of the latch bar 7 which has a circular cross-section.

When the lid 2 is open, the recess 14 is masked by a pivotable flap 11 which is mounted on the lid inner part 5. The flap 11 is connected to a spring element (not shown) which biases the flap to the vertical position when the lid 2 is open, but allows the lock part to pivot it clockwise along the dotted dash-line to the position shown in FIG. 2 when the lid 2 is closed. The flap 11 surrounds the latch bar 7 and prevents foreign bodies from penetrating into the cavity 4 when the lid 2 is open. The danger of injury by projecting parts is also reduced.

When the lid 2 is moved towards the container 1, the bar portion 7' presses a bolt 10 (FIG. 3) and the latch 8 apart. The bolt 10 is mounted pivotably in the lock part 6 and is connected to a return spring (not shown) which biases the bolt to an open position (clockwise from the closed position in FIG. 3). When the lid 2 is opened, the bolt 10 pivots clockwise and places its lug 10a into the recess 8' of the latch 8 which has been rotated counterclockwise from the position shown in FIG. 3 as explained later. The inclined approach surfaces 8b of a hook part 8a of the latch 8 and the inclined approach surfaces 10b of the bolt 10 when engaged form an abutment wedge-shaped entry gap for the latch bar part 7' to engage when the lid is closed.

Figure 3:
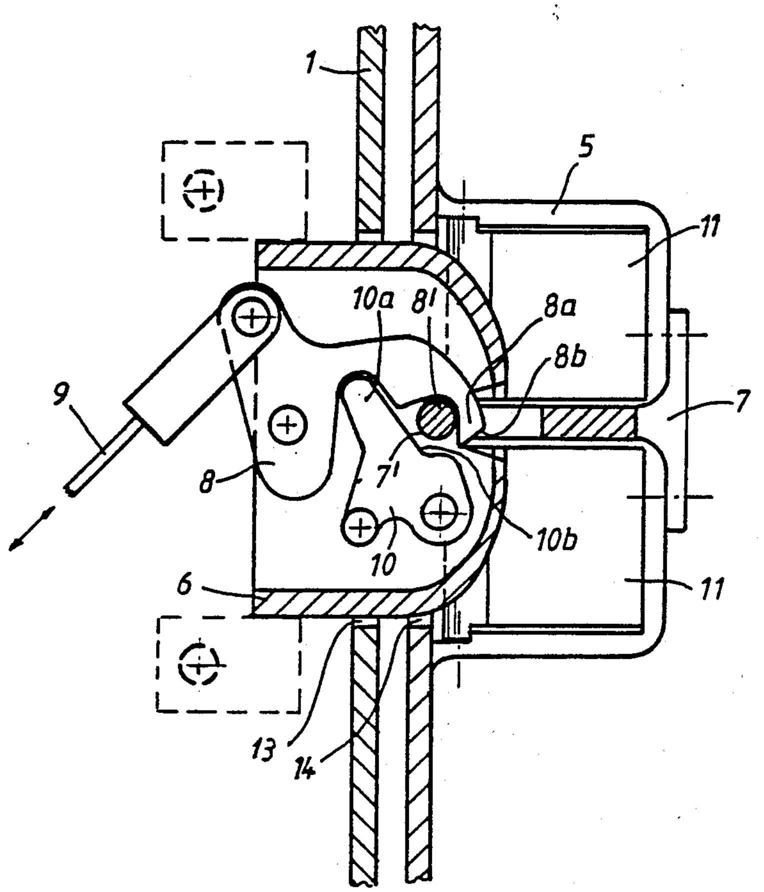
FIG. 3 shows a section made along the line II—II in FIG. 2.

The closing mechanism of the closing device is illustrated differently in FIG. 3. In the closed position the latch bar 7' is located within the lock part 6 and is retained by the hooked part 8a of the latch 8, which embraces the latch bar part 7'. The construction of a recess 8' on the latch 8 is adapted to the shape of the latch bar part 7' for this purpose. The latch 8 is mounted pivotably on the base of the lock part 6 and is engaged with a return spring, (not shown) which tends to rotate latch 8 clockwise. A traction cable 9, which is fastened eccentrically and pivotably to the latch 8, is connected by its free end to a lock or an automatic closing device. Both the lock and the automatic closing device should preferably be arranged outside the collision region of the vehicle occupants. When the traction cable 9 is activated the latch 8 is pivoted towards the housing of the lock part 6, the engagement of the latch bar 7' being released.

When it is desired to release the lock from the closed FIG. 3 position, the traction cable 9 is pulled. This causes latch 8 to pivot counterclockwise such that lug 10a is released at the same time hook part 8a releases latch bar part 7'. As stated previously bolt 10 is spring biased to rotate clockwise. Thus as lug 10a is released, lug 10a rotates to be engaged by hook part 8a while at the same time the surface 10b pushes on the adjacent edge of the latch bar 7' moving latch 7 and lid 2 to an open position. The lug 10a is then held by hook part 8a.

When it is desired to latch the lid 2, it is rotated counter-clockwise about its pivot which causes latch bar 7' to abut the abutment wedge-shaped entry gap defined by surface 8b of latch 8 and surface 10b of bolt 10. As the lid closes the inclined surface 8b is camed upwardly to release lug 10a which previously abutted hook part 8a. At the lid closes further, latch bar 7' cams inclined surface-10a to the left (as bolt 10 rotates counter-clockwise) until such time as the latch bar 7' nears the position shown in FIG. 3. When lug 10a is rotated counterclockwise enough it enters the slot in latch 8 allowing the spring to rotate latch 8 clockwise bringing hook part 8a behind latch bar 7' into internal aperture 7a to lock the lid 2 closed.

The danger of injury can be reduced in the glove box according to the invention by the arrangement of the closing device. No parts of the closing device are arranged in the collision region of the vehicle occupants. Forcing of the closing device is also rendered more difficult because all parts are masked and difficult to access from the outside.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Glove box for motor vehicles, comprising:
a container;
a lid which is mounted pivotably about an axis on the container between an open and closed position;
said lid having an inner part forming a cavity constructed to house parts of a closing device, comprising:
a lock part fastened to an instrument panel of the vehicle;
a latch located in said lock part;
a latch bar lockingly cooperating with the latch;
said latch bar, arranged within a cavity in the lid;
a recess opening means in a lid inner part to permit introduction of the latch bar and a portion of the lock part into the cavity in the closed position of the lid.

2. Glove box according to claim 1, wherein the recess opening means on the lid inner part is masked by a flap means pivotably mounted on the lid inner part when the lid is closed.

3. Glove box according to claim 2, wherein the latch and a bolt are mounted pivotably in the lock part and are spring biased to an end position and wherein the latch and the bolt cooperate to retain the latch bar in the locked position.

4. Glove box according to claim 3, wherein the latch is connected to an eccentrically and pivotably fastened traction actuation cable.

5. Glove box according to claim 3, wherein that the latch bar is detachably arranged on the inner lid part.

6. Glove box according to claim 3, wherein the bolt has its spring move the bolt to a position to also cause the lid to begin to open after the latch has been moved to release the bolt holding the latch.

* * * * *